(12) United States Patent
Schussler

(10) Patent No.: US 8,038,865 B2
(45) Date of Patent: Oct. 18, 2011

(54) DIAPHRAGM FOR ELECTROLYTIC CELL

(75) Inventor: Henry W. Schussler, Harrison City, PA (US)

(73) Assignee: PPG Industries, Ohio Inc., Cleveland, OH (US)

( * ) Notice: Subject to any disclaimer, the term of this patent is extended or adjusted under 35 U.S.C. 154(b) by 554 days.

(21) Appl. No.: 12/117,807

(22) Filed: May 9, 2008

(65) Prior Publication Data

US 2008/0289956 A1    Nov. 27, 2008

Related U.S. Application Data

(60) Provisional application No. 60/917,473, filed on May 11, 2007, provisional application No. 60/917,481, filed on May 11, 2007.

(51) Int. Cl.
- C25B 15/08 (2006.01)
- C25B 15/06 (2006.01)
- C25B 13/04 (2006.01)
- C25B 13/08 (2006.01)
- C25B 9/10 (2006.01)
- C25B 9/08 (2006.01)

(52) U.S. Cl. ........ 205/350; 204/263; 204/232; 204/252; 427/243; 427/245

(58) Field of Classification Search ................. 204/295, 204/296, 252, 263; 427/243, 245, 247; 205/350
See application file for complete search history.

(56) References Cited

U.S. PATENT DOCUMENTS

| | | | |
|---|---|---|---|
| 4,174,266 A * | 11/1979 | Jeffery | ............. 205/350 |
| 4,349,456 A | 9/1982 | Sowman | |
| 4,421,562 A | 12/1983 | Sands | |
| 4,564,556 A | 1/1986 | Lange | |
| 4,637,990 A | 1/1987 | Torobin et al. | |
| 4,680,101 A | 7/1987 | Darlington et al. | |
| 4,744,831 A | 5/1988 | Beck | |
| 4,869,793 A | 9/1989 | Kinney | |
| 4,931,414 A | 6/1990 | Wood et al. | |
| 5,030,403 A | 7/1991 | Pickens et al. | |
| 5,077,241 A | 12/1991 | Mob et al. | |
| 5,116,701 A | 5/1992 | Kalisz | |
| 5,188,712 A | 2/1993 | Dilmore et al. | |
| 5,612,089 A | 3/1997 | Dilmore, Jr. et al. | |
| 5,683,749 A | 11/1997 | DuBois et al. | |
| 6,059,944 A * | 5/2000 | DuBois et al. | ............. 204/296 |
| 6,296,745 B1 | 10/2001 | DuBois et al. | |
| 6,299,939 B1 | 10/2001 | DuBois et al. | |
| 6,951,577 B2 | 10/2005 | Carter et al. | |
| 2001/0038946 A1 | 11/2001 | Rao | |
| 2007/0045105 A1 * | 3/2007 | Schussler et al. | ............. 204/230.2 |

FOREIGN PATENT DOCUMENTS

GP    1501581    2/1978

* cited by examiner

*Primary Examiner* — Bruce Bell
(74) *Attorney, Agent, or Firm* — Linda Pingitore; Irwin M. Stein

(57) ABSTRACT

Describes a diaphragm for an electrolytic diaphragm cell, e.g., a chlor-alkali cell, in which the diaphragm comprises fibrous material substantially resistant to the environment within the electrolytic cell and spheroidal ceramic microspheres at least partially resistant to the environment within the electrolytic cell associated with said diaphragm. Also describes a diaphragm for an electrolytic cell in which the diaphragm comprises a base mat of fibrous material chosen from asbestos fibers, resin-modified asbestos fibers, synthetic fibers, or mixtures of such fibers on which base mat is applied a coating comprising spheroidal ceramic microspheres. Further describes a synthetic diaphragm for an electrolytic cell, e.g., a chlor-alkali cell, on which is applied a coating comprising substantially water-insoluble inorganic particulate material, e.g., clay material, and spheroidal ceramic microspheres. Still further describes adding a dopant composition comprising spheroidal ceramic microspheres to the anolyte compartment of an electrolytic cell, e.g., a chlor-alkali cell, while the cell is operating.

36 Claims, No Drawings

DIAPHRAGM FOR ELECTROLYTIC CELL

CROSS-REFERENCE TO RELATED APPLICATIONS

This application claims the benefit of priority of U.S. Provisional Patent Application Ser. No. 60/917,473, filed May 11, 2007 and entitled Diaphragm For Electrolytic Cell and U.S. Provisional Patent Application Ser. No. 60/917,481, filed May 11, 2007 and entitled Method Of Operating A Diaphragm Electrolytic Cell.

FIELD OF THE INVENTION

The present invention relates to diaphragms for electrolytic diaphragm cells, to methods for preparing such diaphragms, to electrolytic cells containing such diaphragms and to the operation of electrolytic cells containing such diaphragms.

BACKGROUND OF THE INVENTION

Electrochemical processing of inorganic chemicals in electrolytic diaphragm cells for the production of other inorganic materials is well known. The electrolytic cell generally comprises an anolyte compartment containing an anode, a catholyte compartment containing a cathode, and a liquid electrolyte-permeable microporous diaphragm that separates the anolyte compartment from the catholyte compartment. Diaphragms are used, for example, to separate an oxidizing electrolyte from a reducing electrolyte, a concentrated electrolyte from a dilute electrolyte, or a basic electrolyte from an acidic electrolyte.

A non-limiting example of an electrolytic diaphragm cell is the electrolytic diaphragm cell used for the electrolysis of aqueous alkali metal halide solutions, e.g., a chlor-alkali cell. In such an electrolytic cell, the diaphragm is generally formed on a foraminous metal cathode (which together form a cathode structure) and separates an acidic liquid anolyte from an alkaline liquid catholyte. The electrolysis of an aqueous alkali metal halide solution (liquid brine) generally involves introducing liquid brine into the anolyte compartment of the cell and allowing the brine to percolate through the liquid brine-permeable microporous diaphragm into the catholyte compartment. The microporous diaphragm is sufficiently porous to allow the hydrodynamic flow of brine through it, while at the same time inhibiting the back migration of hydroxyl ions from the catholyte compartment into the anolyte compartment.

When direct current is applied across the electrodes of the alkali metal halide electrolytic cell, halogen gas is evolved at the anode, hydrogen gas is evolved at the cathode, and an aqueous alkali metal hydroxide solution is formed in the catholyte compartment. In the case of the electrolysis of aqueous sodium chloride solutions, the halogen produced is chlorine and the alkali metal hydroxide formed is sodium hydroxide. Catholyte liquor comprising alkali metal hydroxide and unconverted brine is removed from the catholyte compartment of the cell, and alkali metal hydroxide is recovered from the catholyte liquor.

In addition to the primary products (halogen and alkali metal hydroxide) that are produced during electrolysis of aqueous alkali metal halide solutions, small amounts of alkali metal chlorate, e.g., sodium chlorate, can be produced as a by-product. Alkali metal chlorate by-product is found in the recovered alkali metal hydroxide product. Alkali metal chlorate is corrosive to process equipment downstream of the electrolytic cell and its presence in the alkali metal hydroxide product may require treatment of that product to reduce or remove the alkali metal chlorate present therein, thereby to avoid its corrosive effect on downstream process equipment. The production of alkali metal chlorate may also result in a reduction in the efficiency of the electrolytic cell.

BRIEF SUMMARY OF THE INVENTION

In accordance with the present invention, there is provided a liquid-permeable diaphragm for use in an electrolytic diaphragm cell, wherein the diaphragm comprises (a) a base comprising fibrous material that is substantially resistant to the environment within the electrolytic cell, and (b) ceramic microspheres that are at least partially resistant to the environment within the electrolytic cell associated with said base. The ceramic microspheres can be associated with the diaphragm of an electrolytic cell by applying a coating comprising ceramic microspheres to the fibrous material comprising the base of the diaphragm. The aforementioned coating can be a distinct coating and/or a coating that is at least partially embedded in the fibrous material. Also, the ceramic microspheres can be associated with the diaphragm of an electrolytic cell by doping the diaphragm, e.g., during electrolytic cell operation, with dopant material comprising ceramic microspheres. Further, ceramic microspheres can be associated with the diaphragm of an electrolytic cell by applying a coating (distinct and/or at least partially embedded in the base) comprising ceramic microspheres to the fibrous material comprising the base of the diaphragm and doping the coated diaphragm with dopant material comprising ceramic microspheres.

Additionally, there is provided a method of forming a liquid-permeable diaphragm for use in an electrolytic diaphragm cell, e.g., a chlor-alkali electrolytic cell, which method comprises (a) forming a liquid-permeable base comprising fibrous material that is substantially resistant to the environment within the electrolytic cell on a foraminous metal cathode, and (b) applying to said base at least one coating comprising ceramic microspheres that are at least partially resistant to the environment within the electrolytic diaphragm cell. The cathode structure comprising the foraminous cathode and the diaphragm can be incorporated into an electrolytic diaphragm cell, and the electrolytic cell can be used for the electrolysis of inorganic materials, e.g., the electrolysis of aqueous solutions of alkali metal halide salts, such as sodium chloride.

DETAILED DESCRIPTION OF THE INVENTION

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in measuring instruments. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., sub-ranges having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used in the following description and claims, the following terms have the indicated meanings:

The term "associated with", as used for example with reference to ceramic microspheres being associated with the diaphragm, means that ceramic microspheres are joined, linked, united with or connected to the diaphragm either directly and/or indirectly, such as on or within the matrix of the fibrous material comprising the foundation or base, e.g., base mat, of the diaphragm, and/or on or within a coating applied to the fibrous material comprising the foundation or base of the diaphragm.

The term "ceramic microsphere" means an inorganic ceramic metal oxide particle that is at least partially resistant to the environment within the electrolytic diaphragm cell into which the ceramic microsphere is introduced, e.g., at least partially resistant to the corrosive conditions within the anolyte compartment of the electrolytic diaphragm cell. As used herein the term "metal" includes semi-metals. Non-limiting examples of metals that can be used to prepare ceramic microspheres include: silicon, aluminum, boron, vanadium, niobium, tantalum, titanium, zirconium, hafnium, molybdenum, chromium, tungsten, iron, cobalt, nickel, copper, zinc, cadmium, cerium, lanthanum, yttrium, beryllium, calcium, barium, magnesium, tin, lead, gallium, germanium, and mixtures of such metals.

The term "spheroidal" means a shape resembling a sphere, e.g., a true sphere or like a sphere. The spheroidal shape can be oblate or prolate.

The term "microsphere" means a particle having a spheroidal shape, and a nominal dimension that is, but is not limited to, generally less than approximately 1000 microns.

The term "chlor-alkali cell" or terms of like import means an electrolytic diaphragm cell for the production of halogen, e.g., chlorine, and alkali metal hydroxide, e.g., sodium hydroxide, by the electrolysis of aqueous alkali metal halide solutions (brine), e.g., sodium chloride brine.

The term "diaphragm" means a microporous, liquid electrolyte permeable material that in conjunction with the cathode separates the anolyte compartment from the catholyte compartment of an electrolytic diaphragm cell. In the case of a chlor-alkali electrolytic cell, the diaphragm may be, but is not limited to, an asbestos-type diaphragm, including the so-called polymer- or resin-modified asbestos diaphragm, e.g., asbestos in combination with polymeric resins such as fluorocarbon resins, or a synthetic diaphragm.

The term "electrolytic diaphragm cell", "electrolytic cell" or a term of like import means an electrolytic cell for conducting an electrochemical process wherein a liquid electrolyte percolates through a microporous diaphragm that separates the anolyte and catholyte compartments of the cell. In response to an electrical field that is generated between an anode contained in the anolyte compartment and a cathode contained in the catholyte compartment, the liquid electrolyte is dissociated to synthesize chemical materials, e.g., inorganic materials. In a non-limiting embodiment, the electrolytic cell is a chlor-alkali cell.

The terms "on", "appended to", "affixed to", "adhered to", "applied to", "deposited on" or terms of like import means that the referenced material is either directly connected to the described surface, e.g., superimposed on and/or embedded within the described surface, or indirectly connected to the described surface through one or more other layers (superposed on).

The term "synthetic diaphragm" means a diaphragm that comprises primarily fibrous organic polymeric material that is substantially resistant to the environment within the electrolytic cell, e.g., a chlor-alkali electrolytic cell, particularly the corrosive environments found in the anolyte and catholyte compartments of the cell. In a non-limiting embodiment, the synthetic diaphragm is substantially free of asbestos, i.e., the synthetic diaphragm contains not more than 5 weight percent of asbestos. In alternate non-limiting embodiments, the synthetic diaphragm contains not more than 3, e.g., not more than 2 or 1, weight percent of asbestos. In a further non-limiting embodiment, the synthetic diaphragm is totally free of asbestos (a non-asbestos-containing diaphragm).

The term "substantially resistant to the environment within the electrolytic cell" or terms of like import, as used for example with reference to the fibrous material comprising the base of the diaphragm, means that the referenced material, e.g., fibers of polytetrafluoroethylene, is substantially resistant to chemical and/or physical degradation, e.g., chemical dissolution and/or mechanical erosion, by the conditions within the operating electrolytic cell, e.g., the catholyte and/or the anolyte compartments, for a commercially acceptable period of time during the operating life of the electrolytic cell.

The term "at least partially resistant to the environment (or corrosive conditions) within the electrolytic cell", e.g., within the anolyte and catholyte compartments, or a term of like import, as used for example with reference to the ceramic microspheres associated with the diaphragm of the electrolytic cell, means that the referenced material is reasonably resistant to chemical and/or physical degradation, e.g., chemical dissolution and/or mechanical erosion, by conditions existing within the operating electrolytic cell for a reasonable period of time.

The term "stable operating conditions" or a term of like import, as used in connection with the operation of an electrolytic cell, means that the electrolytic cell operates with an acceptable liquid level differential between the anolyte and catholyte compartments and within a range of predetermined acceptable levels of principal product production at the power load imposed on the cell.

The terms "dopant", "dopant material" or a term of like import means material, such as particulate and/or fibrous material, that is introduced into the anolyte compartment of an electrolytic cell, e.g., applied to the surface of the diaphragm such as a coated diaphragm, to regulate the permeability of the diaphragm. Dopant materials may be applied to the diaphragm during formation of the diaphragm, during start tip of the electrolytic cell, and/or during operation of the electrolytic cell to adjust the permeability of the diaphragm. Non-limiting examples of dopant materials include inorganic particulate material such as ceramic microspheres, clay minerals, non-ceramic oxides of valve metals, e.g., titanium and zirconium, ceramic fibers, organic fibrous material (fibers) comprising halogen-containing polymers, e.g., fluorocarbon fibers such as polytetrafluororethylene fibers or fibrils, and the oxides and hydroxides of alkaline earth metals, e.g., magnesium.

The terms "to dope", "doping" or terms of like import, as used in reference to the electrolytic cell, means applying dopant material to the diaphragm of the electrolytic cell, e.g., by providing dopant material within the anolyte compartment of the electrolytic cell while the cell is operating.

The term "fluorocarbon fiber" means fluorine-containing polymeric hydrocarbon fibers, e.g., polytetrafluoroethylene. The fluorocarbon fiber can also contain other halogens, e.g., chlorine, such as polychlorotrifluoroethylene, and can be comprised of a mixture of halogen-containing polymer fibers.

The term "valve metal" means metals including, but not limited to, vanadium, chromium, zirconium, niobium, molybdenum, hafnium, tantalum, titanium, and tungsten.

For purposes of convenience, the following disclosure is directed with particular reference to chlor-alkali electrolytic cells; but, as one skilled in the art can appreciate, the method of the present invention is also applicable to other diaphragm-containing electrolytic cells that are used for conducting an electrochemical process. In a non-limiting embodiment, the electrochemical process is used for the electrolysis of inorganic materials, e.g., aqueous inorganic alkali metal halide salt solutions, such as sodium chloride brine.

As noted, diaphragms used in electrolytic chlor-alkali diaphragm cells are liquid permeable so as to allow a liquid electrolyte, such as sodium chloride brine, to pass through the diaphragm in response to a pressure gradient supplied by a hydrostatic head on the anolyte side of the cell. The liquid level of the anolyte in the anolyte compartment during stable operating conditions will be on the order of from 1 to 25 inches (2.54 to 63.5 centimeter-s) higher than the liquid level of the catholyte in the catholyte compartment, thereby providing a hydrostatic head that provides the pressure gradient which forces the liquid electrolyte through the diaphragm.

The specific flow rate of alkali metal halide brine through the diaphragm is generally set at a rate that allows for the production of a predetermined, targeted alkali metal hydroxide concentration, e.g., sodium hydroxide concentration, in the catholyte compartment, and a rate that maintains an acceptable liquid level differential between the anolyte and catholyte compartments. The flow rate of alkali metal halide brine is a function of the porosity, e.g., microporosity, of the diaphragm and the tortuosity of the pores within the diaphragm (permeability). Generally, it is desired that the permeability of a chlor-alkali electrolytic cell synthetic diaphragm be substantially similar to that of asbestos-type and polymer modified asbestos-type diaphragms.

The diaphragm of a chlor-alkali electrolytic cell can be prepared by forming on a foraminous metal cathode a foundation or base comprising fibrous material(s) that is substantially resistant to the environment within the electrolytic cell, e.g., the corrosive conditions within the cell. This foundation or base has been referred to as the "base mat" of the diaphragm. The base mat of the diaphragm, as described subsequently herein, is usually too permeable initially to operate with conventional alkali metal halide flow rates, i.e., it is too permeable to maintain a normal level of anolyte liquid in the cell during electrolytic cell operation. In order to lower the permeability of the base mat, improve its integrity, and also to improve adhesion of the base mat to the foraminous cathode, at least one coating (often referred to as a topcoat) may be applied to the base mat. A principal function of the topcoat(s) for the base mat is to modify the initial permeability of the base mat so that the flow rate of electrolyte through the diaphragm is acceptable for stable cell operation. In the case of a chlor-alkali electrolytic cell, the flow rate of electrolyte (sodium chloride brine) through the diaphragm is generally within an operating range of from 0.001 to 0.5 cubic centimeters per minute per square centimeter of effective diaphragm surface area.

In accordance with the present invention, ceramic microspheres that are at least partially resistant to the environment within the electrolytic cell can be associated with the diaphragm of an electrolytic diaphragm cell, e.g., to adjust the permeability of the diaphragm. Also, ceramic microspheres that are at least partially resistant to the environment within the electrolytic cell can be associated with the diaphragm of a chlor-alkali electrolytic diaphragm cell to modify, i.e., lower, the amount of alkali metal chlorate, e.g., sodium chlorate, that is produced by the electrolytic process occurring in the chlor-alkali cell.

Alkali metal chlorate can be a by-product of chlor-alkali electrolytic diaphragm cells, and when present is corrosive to metallic process equipment downstream of the electrolytic cell, e.g., evaporators used to concentrate the aqueous alkali metal hydroxide product removed from the catholyte compartment of the electrolytic cell. Alkali metal chlorate is produced in the electrolytic cell by both chemical and electrochemical reactions. In the former, hypohalite ion, e.g., hypochlorite ion, is oxidized by free hypohalous acid, e.g., hypochlorous acid. Hypohalite ion, e.g., hypochlorite ion, is produced in the cell by the reaction of hydroxyl ion with halogen, e.g., chlorine, as a result of either migration of hydroxyl ion into the anolyte compartment or migration of halogen into the catholyte compartment. Alkali metal chlorate is produced primarily in the anolyte compartment and is carried into the catholyte compartment by the anolyte liquor comprising the brine feed that flows through the diaphragm into the catholyte compartment.

A coating composition can be used to coat the base mat of the diaphragm comprising ceramic microspheres. Also, ceramic microspheres can be used as dopant material, either alone or in combination with other dopant materials, to dope the diaphragm. Further, ceramic microspheres are used to dope a diaphragm having at least one coating comprising ceramic microspheres. In accordance with the aforedescribed non-limiting embodiments, ceramic microspheres are "associated" with the diaphragm.

The ceramic microspheres associated with the diaphragm of an electrolytic diaphragm cell can be hollow or solid, porous or impermeable, crystalline or amorphous, and transparent, translucent or opaque. The ceramic microsphere may be a vitreous or non-vitreous material. By vitreous is meant that the material is derived from a melt. The ceramic microsphere generally comprises flee flowing discrete particles that have a low density, e.g., 2.1-2.5 grams/cubic centimeter. The solubility of the ceramic microsphere in water at standard conditions of temperature and pressure is nil, e.g., they are substantially water-insoluble.

The nominal particle size of the ceramic microspheres can vary widely, but generally the size of the particles are in the range of from 0.3 microns to less than 1000 microns, e.g., less than 500 microns. The nominal particle size of the ceramic microspheres can range from 0.3 to 300 microns, such as from 0.3 to 200 microns. Depending on the grade of ceramic microsphere used, the nominal particle size can range from a non-limiting minimum particle size of for example 0.3, 1, 4, 10, 15 or 100 microns to a non-limiting maximum particle size of for example 6, 10, 20, 24, 40, 200 or 300 microns. The particle size distribution of the ceramic microspheres can range between any of the aforesaid values, including the recited values.

Non-vitreous ceramic microspheres can be prepared by a non-melt process comprising the liquid-liquid extraction of aqueous metal oxide precursor material, e.g., a dispersion or sot of one or more ceramic metal oxides, with a dehydrating liquid, e.g., organic alkanols having from 3 to 6 carbon atoms, having a limited water solubility, and drying and firing the resulting gelled microcapsules at temperatures ranging from 250° C. to 1300° C., e.g., from 250° C. to 450° C., or to 650° C. or to 800° C. See, for example, the disclosures found in column 1, line 33 through column 8, line 64 of U.S. Pat. No. 4,349,456; column 3, line 39 through column 7, line 40 of U.S. Pat. No. 4,564,556; and column 2, line 3 through column 7, line 53 of U.S. Pat. No. 4,931,414, all of which disclosures are incorporated herein by reference. Ceramic microspheres are commercially available, for example, under the trade designation ZEEOSPHERES® from the 3M Company, St. Paul, Minn. ZEEOSPHERE materials are available in various particle sizes and particle size distributions. Ceramic microspheres such as alumino-silicate microspheres are also available under the trade designation FILLITE® from Trelleborg Fillite, Inc, Norcross, Ga.

Ceramic microspheres that are associated with the diaphragm can be chosen from one or more of a variety of metal oxides. Non-limiting examples of such metal oxides include: titanium dioxide, chromium oxide ($Cr_2O_3$), tungsten oxide ($WO_3$), ferrous oxide, magnesium oxide (MgO), yttrium oxide ($Y_2O_3$), zirconium dioxide, hafnium dioxide, vanadium oxide ($V_2O_5$), niobium oxide ($Nb_2O_5$), beryllium oxide (BeO), cobalt oxide (CoO), nickel oxide (NiO), cuprous oxide, zinc oxide (ZnO), antimony oxide ($Sb_2O_3$), aluminum oxide ($Al_2O_3$), stannous oxide ($SnO_2$), silicon dioxide, and mixtures of such metal oxides, including but not limited to, aluminum oxide-silicon dioxide, aluminum oxide-boron oxide-silicon dioxide, aluminum oxide-chromium oxide-silicon dioxide, zirconium dioxide-silicon dioxide, zinc oxide-titanium dioxide, titanium dioxide-ferrous oxide, stannous oxide-titanium oxide, aluminum oxide-chromium oxide, magnesium oxide-aluminum oxide, magnesium oxide-aluminum oxide-silicon dioxide, magnesium oxide-titanium dioxide, magnesium oxide-zirconium dioxide, titanium dioxide-ferrous oxide, aluminum oxide, aluminum oxide-chromium oxide-ferrous oxide, zinc oxide-aluminum oxide-chromium oxide, and aluminum oxide-chromium oxide-ferrous oxide-titanium dioxide. Because the precursor material of the ceramic microspheres can be a dispersion or sol comprising compounds containing an alkali metal, the ceramic metal oxide microspheres can also contain an alkali metal, e.g., sodium and/or potassium, after firing of the precursor microcapsules. See, for example, the disclosures in column 3, lines 32 to 65 of U.S. Pat. No. 4,349,456; column 3, lines 38 to 62 of U.S. Pat. No. 4,564,556; and column 2, lines 3 to 50 of U.S. Pat. No. 4,931,414, all of which disclosures are incorporated herein by reference.

At least one coating comprising ceramic microspheres that are at least partially resistant to the environment within the electrolytic cell, e.g., resistant to the conditions within the anolyte compartment of the electrolytic diaphragm cell, can be applied to at least a portion of the base mat comprising the diaphragm. One or more coatings can be applied to the base mat to adjust the permeability of the base mat, e.g., control the rate at which anolyte electrolyte flows through the diaphragm, to a value within the desired operating range chosen for the electrolytic cell. In the case of a chlor-alkali cell, the flow rate of anolyte liquor through the diaphragm is typically within an operating range of from 0.001 to 0.5 cubic centimeters per minute per square centimeter of effective diaphragm surface area.

The amount of ceramic microspheres present in a topcoat layer applied to the base mat of the diaphragm can vary and will depend on the initial permeability of the base mat as well as whether other inorganic particulate materials are used to form the topcoat in conjunction with ceramic microspheres. For example, in the case of chlor-alkali electrolytic cells, the amount of ceramic microsphere material used in the coating composition comprising ceramic microspheres will be an amount that results in the coating(s) adjusting the flow rate of electrolyte through the diaphragm to a flow rate within the desired pre-selected range of flow rates, i.e., a flow rate that is within the aforedescribed range of flow rates.

The ceramic microspheres may be present in the at least one topcoat in amounts of from 5 to 100 weight percent, e.g., 5 to 40 weight percent, based on the total weight of solids in the topcoat. That is, ceramic microspheres can be present in the at least one topcoat in amounts of from 5 or 8, or from 5 to 20, or from 5 to 40, or from 5 to 60, or from 5 to 80 weight percent, e.g., 5 to 30, or from 8 to 20, weight percent. The amount of ceramic microspheres present in the at least one topcoat can vary between any of the previously described values and any higher value. When the ceramic microspheres represent less than 100 weight percent of the solids in the topcoat, other inorganic substantially water-insoluble particulate material(s) is used to make-up the remaining solids.

As described in column 2, line 65 through column 6, line 65 of U.S. Pat. No. 6,299,939 B1, which disclosure is incorporated herein by reference, other inorganic substantially water-insoluble particulate material (other than ceramic microspheres) can be present in the topcoat. Such "other" inorganic particulate material may be chosen from (i) refractory materials, including but not limited to, the oxides, borides, carbides, silicates and nitrides of valve metals, (ii) clay mineral, and (iii) mixtures of (i) and (ii). Of the valve metal oxides, borides, carbides and silicates, valve metal oxides and silicates are generally the materials used. In a non-limiting embodiment, oxides of the valve metals, titanium, zirconium and mixtures of the oxides of such valve metals are used.

In addition to clay mineral and valve metal oxides, borides, carbides, silicates and nitrides, alkaline earth metal oxides and hydrous oxides may be used in the coating composition applied to the diaphragm base mat. In a non-limiting embodiment, alkaline earth metal hydroxide, e.g., magnesium hydroxide, can be used as a component of the coating composition.

The particle size of the "other" water-insoluble inorganic particulate refractory materials can vary over a wide range, and will depend on the structure of the base mat and the design of the apparatus used to deposit the refractory material on the preformed base mat. It has been suggested in the literature that inorganic particulate refractory materials with a mass based median equivalent spherical diameter of from 0.5 to 10 microns, e.g., 1 to 5 microns, can be used. It is understood that although the median particle size will be found in this range, individual size fractions with diameters up to 40 microns and down to 0.3 microns or less may be represented in the distribution of particle sizes.

Non-limiting examples of clay minerals that may be present in the topcoat include the naturally occurring hydrated silicates of metals, such as aluminum and magnesium, e.g., kaolin, meerschaums, augite, talc, vermiculite, wollastonite, montmorillonite, illite, glauconite, attapulgite, sepiolite and hectorite. Of the aforementioned clay minerals, attapulgite and hectorite and mixtures of such clays are generally chosen. Such clays are hydrated magnesium silicates and magnesium aluminum silicates, which materials may also be prepared synthetically. Attapulgite clay is available commercially Linder the trade name ATTAGEL.

The mean particle size of clay mineral material used in the topcoat or (as subsequently described) as a dopant material can vary. In a non-limiting embodiment, the mean particle size may range from 0.1 to 20 microns, e.g., from 0.1 to 0.5 microns. For example, a commercially available attapulgite clay has a mean particle size of 0.1 microns. It is understood that although the mean particle size of the clay mineral will be found in this range, individual size fractions with diameters different than the described particle size ranges may be represented in the distribution of particle sizes.

The topcoat can be applied to the diaphragm base mat by means known to those skilled in the art. For example, the topcoat can be applied to the base mat by dipping the cathode structure (foraminous metal cathode on which is deposited the diaphragm base mat) into a slurry of the materials comprising the topcoat (topcoat slurry), and drawing the topcoat slurry through the cathode structure under vacuum. This procedure can be repeated to deposit one or more additional coatings of the same or different composition on the initial topcoat. The coatings may or may not be dried between coatings. The weight per unit area (base weight) of the topcoat(s) deposited on and within the base mat can vary. In a non-limiting embodiment, the base weight of the topcoat can vary from 0.01 to 0.1 pounds per square foot (0.05 to 0.5 kg/square meter), e.g., 0.03 to 0.08 pounds per square foot (0.15 to 0.4 kg/square meter). The base weight per square foot of the topcoat can vary between any of the previously described values, including the recited values.

The amount of inorganic particulate material (including the ceramic microspheres) in the topcoat slurry can vary and will depend on the amount that is required for the particular diaphragm. For example, the topcoat slurry may contain from 1 to 15 grams per liter (gpl) of inorganic particulate material, such as from 5 to 15 gpl, e.g., 8 to 12 gpl.

The topcoat slurry may also contain alkali metal polyphosphate, e.g., sodium polyphosphate, potassium polyphosphate and mixtures of such polyphosphates. The polyphosphate may be a hydrated polyphosphate, a dehydrated polyphosphate or a mixture of hydrated and dehydrated polyphosphates. In a non-limiting embodiment, the alkali metal polyphosphate may be present in the topcoat slurry in an amount of at least 0.01 weight percent such as at least 0.1 weight percent. Generally, the alkali metal polyphosphate is present in the topcoat slurry in amounts of less than 2 weight percent. The alkali metal polyphosphate can be present in the topcoat slurry in amounts of less than 1 weight percent, e.g., less than 0.5 weight percent. The amount of alkali metal polyphosphate present in the topcoat slurry can range between any of the aforedescribed values, inclusive of the recited values.

Non-limiting examples of alkali metal polyphosphates include tetraalkali metal pyrophosphate, e.g., tetra sodium pyrophosphate and tetra potassium pyrophosphate, alkali metal triphosphate, e.g., sodium triphosphate and potassium triphosphate, alkali metal tetraphosphate, e.g., sodium tetraphosphate, alkali metal hexametaphosphate, e.g., sodium hexametaphosphate, and mixtures of such polyphosphates.

When preparing diaphragms for chlor-alkali electrolytic cells, the liquid medium of the liquid topcoat slurry is an aqueous medium, which can contain alkali metal halide, e.g., sodium chloride, and/or alkali metal hydroxide, e.g., sodium hydroxide, in amounts totaling from 0.01 percent by weight to 10 percent by weight, based on the total weight of the aqueous medium. The aqueous medium can be substantially free of alkali metal halide and/or alkali metal hydroxide. As used herein, and in the claims, by "substantially flee of alkali metal halide and/or alkali metal hydroxide" is meant that the amount of alkali metal halide and/or alkali metal hydroxide present in the aqueous medium of the drawn slurry totals no more than 5 percent by weight, e.g., less than 1 percent by weight, based on the total weight of the aqueous medium. The aqueous medium of the drawn slurry can be obtained from a source of either deionized or distilled water and is free of alkali metal halide and alkali metal hydroxide.

Although not required, the aqueous topcoat slurry may contain a wetting amount of organic surfactant chosen from nonionic, anionic, amphoteric surfactants and mixtures of such surfactants. By "wetting amount" is meant that an amount of organic surfactant that is at least sufficient to wet the diaphragm base mat during deposition of the inorganic particulate material on and within the base mat is present.

The organic surfactant (if used) may be present in the aqueous topcoat slurry in amounts of at least 0.01 percent by weight, e.g., at least 0.02 percent by weight, such as at least 0.05 percent by weight, based on the total weight of the water comprising the aqueous medium. Also, the organic surfactant also may be present in an amount of less than 1 percent by weight, e.g., less than 0.5 percent by weight, such as less than 0.3 percent by weight, based on the total weight of the water comprising the aqueous medium. The amount of organic surfactant used in the aqueous medium of the topcoat slurry drawn through the diaphragm base mat may range between any combination of the upper and lower recited values.

The topcoated diaphragm base mat may be dried, e.g., in an air circulating oven, before use in the electrolytic cell. The topcoated diaphragm can be dried by heating it to temperatures below the sintering or melting point of any fibrous organic material component used to prepare the diaphragm, e.g., the base mat. Drying temperatures and drying times may vary depending on the water content of the topcoated diaphragm base mat and the type of drying equipment available. Drying temperatures and times may range from 50° C. to 100° C., e.g., from 65° C. to 85° C. for from 4 to 20 hours, e.g., from 4 to 12 hours, respectively. To assist in the drying, air may be pulled through the topcoated diaphragm structure by attaching it to a vacuum system. Details of topcoatings and the methods used to form such coatings can be found in U.S. Pat. Nos. 4,869,793, 5,612,089, 5,683,749, 6,059,944 and 6,299,939 B1.

The cathode of a diaphragm electrolytic cell generally comprises a liquid-permeable substrate, e.g., a foraminous metal cathode. The cathode is electroconductive and may be a perforated sheet, a perforated plate, metal mesh, expanded metal mesh, woven screen, an arrangement of metal rods or the like having equivalent openings (nominal diameter) generally in the range of from 0.05 inch (0.13 cm) to 0.125 inch (0.32 cm). The openings in the foraminous metal cathode can range from 0.07 inch (0.17 cm) to 0.1 inch (0.25 cm). The cathode typically is fabricated of iron, an iron alloy or some other metal, such as nickel, that is resistant to the corrosive conditions within the operating electrolytic cell environment to which the cathode is exposed, e.g., the corrosive conditions with the anolyte and catholyte compartments of an operating chlor-alkali electrolytic cell.

Historically, asbestos has been the most common fibrous material used to prepare diaphragms for the electrolysis of alkali metal halide brines because of its chemical resistance to the corrosive conditions that exist in such electrolytic cells. Asbestos in combination with various polymeric resins, particularly fluorocarbon resins (the so-called polymer- or resin-modified asbestos diaphragms) have been used also as diaphragm materials in such electrolytic cells. Due in part to possible health and safety issues associated with air-borne asbestos fibers resulting from the use of asbestos in other applications, synthetic diaphragms, e.g., non-asbestos-containing diaphragms, have been developed for use in chlor-alkali diaphragm electrolytic cells.

Synthetic diaphragms are generally fabricated from fibrous organic polymeric materials that are substantially resistant to the corrosive conditions present within the electrolytic cell, such as a chlor-alkali cell, e.g., the corrosive environments found in the anolyte and catholyte compartments. Known useful fibrous organic polymers include, but are not limited to, polymers, copolymers, graft polymers or combinations of polymers that are substantially chemically resistant to the corrosive conditions in which the diaphragm is employed.

The fibrous organic polymers can be halogen-containing polymer fibers. For example, the halogen-containing polymer fiber can be a fluorocarbon fiber. Non-limiting examples of halogen-containing polymer fibers include fluorine- and fluorine and chlorine-containing polymers, such as perfluorinated polymers, and chlorine-containing polymers that include fluorine. Examples of such halogen-containing polymers and copolymers include, but are not limited to, polymers, such as polyvinyl fluoride, polyvinylidene fluoride, polytetrafluoroethylene (PTFE), polyperfluoro(ethylene-propylene), polytrifluoroethylene, polyfluoroalkoxyethylene (PFA polymer), polychlorotrifluoroethylene (PCTFE polymer) and the copolymer of chlorotrifluoroethylene and ethylene (CTFE polymer). Generally, the synthetic diaphragm is formed from a composition comprising polytetrafluoroethylene.

An important property of the synthetic diaphragm is its ability to wick (wet) the electrolyte, e.g., the aqueous alkali metal halide solution, which percolates through the diaphragm. To provide the property of wettability, the synthetic diaphragm generally further comprises ion-exchange materials having cation selective groups thereon, e.g., acid groups. Such acid groups can include, but are not limited to, sulfonic acid groups, carboxylic acid groups and their derivatives, e.g., esters, phosphonic acid groups, and phosphoric acid groups. Generally, the acid group is either a sulfonic acid groups or a carboxylic acid group.

The ion-exchange material can be a perfluorinated copolymer material prepared from the polymerization of a fluorovinyl ether monomer containing a functional group, e.g., an ion-exchange group or a functional group easily converted into an ion-exchange group, and a monomer chosen from fluorovinyl compounds, such as vinyl fluoride, vinylidene fluoride, trifluoroethylene, tetrafluoroethylene, hexafluoroethylene, hexafluoropropylene, chlorotrifluoroethylene and perfluoro(alkylvinyl ether), with the alkyl being an alkyl group containing from 1 to 10 carbon atoms. A description of such ion-exchange materials can be found in column 5, line 36 through column 6, line 2 of U.S. Pat. No. 4,680,101, which disclosure is incorporated herein by reference. Generally, an ion-exchange material with sulfonic acid functionality is used. A perfluorosulfonic acid ion-exchange material (5 weight percent solution) is available from E.I. du Pont de Nemours and Company under the trade name NAFION. Other appropriate halogenated ion-exchange materials that can be used to allow the diaphragm to be wetted by the aqueous brine fed to the anolyte compartment of the electrolytic cell include, for example, the ion-exchange material available from Asahi Glass Company, Ltd. under the trade name FLEMION.

Organic polymeric materials in the form of microfibrils are also generally used to prepare synthetic diaphragms. Such microfibrils can be prepared in accordance with the method described in U.S. Pat. No. 5,030,403, which disclosed method is incorporated herein by reference. The fibers and microfibrils of the organic polymeric material, e.g., PTFE fibers and PTFE microfibrils, generally comprise the predominant portion of the diaphragm solids. As the ion-exchange material is often more costly than the polymer fibers and microfibrils, the diaphragm generally comprises from 65 to 93 percent by weight combined of such fibers and microfibrils and from 0.5 to 2 percent by weight of the ion-exchange material.

The organic fibrous polymers of the synthetic diaphragm are generally used in particulate form, e.g., in the form of particulates or fibers, as is well known in the art. In the form of fibers, the organic polymer material generally has a fiber length of up to 0.75 inch (1.91 cm) and a diameter of from 1 to 250 microns. Polymer fibers comprising the diaphragm can be of any suitable denier, e.g., commercially available fibers. In one non-limiting embodiment, the PTFE fiber used to prepare synthetic diaphragms is a 0.25 inch (0.64 cm) chopped 6.6 denier fiber; however, other lengths and fibers of smaller or larger deniers can be used.

In addition to the aforedescribed fibers and microfibrils of halogen-containing polymers and ion-exchange materials, the liquid slurry used to deposit a synthetic diaphragm on a foraminous cathode can also include other materials. Such other materials include, but are not limited to, materials such as thickeners, surfactants, antifoaming agents and antimicrobial agents. For example, a thickening agent such as CELLOSIZE® materials can be used. In a non-limiting embodiment, from 0.1 to 5 percent by weight of thickening agent can be added to the slurry mixture, basis the total weight of the slurry. In an alternate non-limiting embodiment, from 0.1 to 2 percent by weight thickening agent is used.

Antifoaming amounts of an antifoaming agent, such as UCON® 500 antifoaming compound, to prevent the generation of excessive foam during mixing of the slurry, and an antimicrobial agent to prevent the digestion of cellulose-based components by microbes during storage of the slurry can be used in the liquid slurry. A non-limiting example of an antimicrobial agent is UCARCIDE® 250, which is available from the Dow Chemical Company. Other antimicrobial agents known to those skilled in the art also can be used. Generally, antimicrobial agents are incorporated into the aqueous slurry of synthetic diaphragm components in amounts of from 0.05 to 0.5 percent by weight, e.g., between 0.08 and 0.2 weight percent, based on the total weight of the slurry.

A surfactant may, if desired, be added to an aqueous slurry of synthetic diaphragm components to assist in obtaining an appropriate dispersion. In a non-limiting embodiment, the surfactant can be a nonionic surfactant that is present in amounts of from 0 to 3 percent, e.g., from 0.1 to 1 percent, by weight, based on the total weight of the slurry. In a non-limiting embodiment, the nonionic surfactant is a chloride capped ethoxylated aliphatic alcohols, wherein the hydrophobic portion of the surfactant is a hydrocarbon group containing from 8 to 15, e.g., 12 to 15, carbon atoms, and the average number of ethoxylate groups ranges from 5 to 15, e.g., 9 to 10. A non-limiting example of such a nonionic surfactant is AVANEL® N-925 surfactant.

Further, other polymers, e.g., polyethylene, and materials such as fiberglass may also be incorporated into the diaphragm. A non-limiting example of the components of a synthetic diaphragm material useful in a chlor-alkali electrolytic cell can be found in Example 1 of U.S. Pat. No. 5,188,712, the disclosure of which synthetic diaphragm composition is incorporated herein by reference.

The base mat of the synthetic diaphragm can be formed on the foraminous metal cathode by depositing (in one or more steps) the materials comprising the base mat onto the foraminous cathode substrate from an aqueous slurry of those materials. The slurry can comprise an aqueous liquid medium such as water. Such an aqueous slurry generally comprises from 1 to 6 weight percent solids, e.g., from 1.5 to 3.5 weight percent solids, of the diaphragm components, and has a pH of between 8 and 11. The appropriate pH can be obtained by the addition of an alkaline reagent, such as alkali metal hydroxide, e.g., sodium hydroxide, to the slurry.

Generally, the slurry comprising the components of the base mat is drawn through the foraminous cathode with the aid of a vacuum pump. The vacuum established by the vacuum pump can be increased as the thickness of the base mat layer deposited increases, e.g., to a final vacuum of from 15 inches (381 mm) to 20 inches (508 mm) of mercury. The foraminous cathode-base mat structure is withdrawn from the slurry usually with the vacuum still applied to insure adhesion of the base mat to the foraminous cathode. In a non-limiting embodiment, the weight per unit area of the base mat can vary from 0.3 to 0.6 pounds per square foot (1.46 to 2.9 kg/square meter), e.g., from 0.38 to 0.55 pounds per square foot (1.85 to 2.68 kg/square meter). The base mat can have a thickness of from 0.075 to 0.25 inches (0.19 to 0.64 cm), e.g., from 0.1 to 0.15 inches (0.25 to 0.38 cm).

The amount of each of the components comprising the synthetic diaphragm can vary in accordance with variations known to those skilled in the art. In one non-limiting embodiment, the following approximate amounts (as a percentage by weight of the total slurry having a percent solids of between 1 and 6 weight percent) of the diaphragm components in a slurry used to deposit a synthetic diaphragm can be used: polyfluorocarbon fibers, e.g., PTFE fibers, —from 0.25 to 1.5 percent; polyfluorocarbon microfibrils, e.g., PTFE microfibrils, —from 0.6 to 3.8 percent; ion-exchange material, e.g., NAFION resin, —from 0.01 to 0.05 percent; fiberglass—from 0.0 to 0.4 percent; and polyolefin, e.g., polyethylene, such as SHORT STUFF, —from 0.06 to 0.3 percent. A non-limiting example of the components of a synthetic diaphragm material useful in a chlor-alkali electrolytic cell can be found in Example 1 of U.S. Pat. No. 5,188,712, the disclosure of which synthetic diaphragm composition is incorporated herein by reference.

The thickness of the diaphragm used in electrolytic cells can vary and will depend on the type of electrolytic cell used and the nature of the electrochemical process being performed. In the case of chlor-alkali electrolytic cells, diaphragms, e.g., synthetic diaphragms, generally have a thickness of from 0.075 to 0.25 inches (0.19 to 0.64 cm), and a weight per unit area ranging from 0.3 to 0.6 pounds per square foot (1.5 to 2.9 kilograms per square meter) of the cathode.

A variety of electrolytic cells (electrolyzers) known to those skilled in the art can be used for the electrolysis of aqueous alkali metal halide solutions. In alternate non-limiting embodiments, the electrolyzers are monopolar or bipolar cells that contain planar and non-planar electrodes, e.g., cathodes. Generally, electrolysis is performed in a plurality of housings comprising a plurality of individual electrolytic cell units wherein a succession of anode units alternate with cathode assemblies. In one non-limiting embodiment, the electrolyzer is a bipolar electrolyzer wherein substantially vertical cathodes are interleaved or positioned within and spaced from substantially vertical anodes. This type of electrode assembly has been referred to as a fingered configuration, e.g., wherein a series of cathode fingers and anode fingers are interleaved with one another.

Electrolysis of alkali metal halide brines typically involves charging an aqueous solution of the alkali metal halide salt, e.g., sodium chloride brine, to the anolyte compartment of the cell. The alkali metal halide brine typically contains alkali metal halide in an amount of from 24 to 26 percent by weight. The aqueous brine percolates through the liquid-permeable microporous diaphragm into the catholyte compartment and then is withdrawn from the cell. With the application of an electric potential across the anodes and cathodes of the cell, e.g., by the use of direct electric current, electrolysis of a portion of the percolating alkali metal halide occurs, and halogen gas, e.g., chlorine, is produced at the anode, while hydrogen gas is produced at the cathode. An aqueous solution of alkali metal hydroxide, e.g., sodium hydroxide, is produced in the catholyte compartment from the combination of alkali metal ions with hydroxyl ions. The resultant catholyte liquor, which comprises principally alkali metal hydroxide and alkali metal halide brine, is withdrawn from the catholyte compartment. The alkali metal hydroxide product is subsequently separated from the catholyte liquor.

During start up of a chlor-alkali electrolytic diaphragm cell, it is often necessary to adjust the permeability of the diaphragm by adding dopant material to the anolyte compartment. Further, subsequent to start up and during operation of the chlor-alkali electrolytic cell, the permeability of the diaphragm can increase, which can result for example in reduced current efficiency, the production of overly dilute alkali metal hydroxide solutions in the catholyte compartment, the back migration of hydroxyl ions from the catholyte compartment into the anolyte compartment, a lowering of the level of anolyte liquor in the anolyte compartment, and an increased risk of the mixing of evolved hydrogen and chlorine gases. To adjust and optimize the permeability of the diaphragm during cell operation, dopant material such as clay mineral, may be added periodically to the anolyte compartment of the electrolytic cell to regulate, e.g., decrease, the permeability of the diaphragm. This procedure is commonly known as doping the cell.

The ceramic microsphere material can be associated with the diaphragm by introducing ceramic microspheres into the anolyte compartment as a dopant material, alone or with other dopant materials. Dopant material is used in amounts sufficient to reduce the flow of liquid anolyte (electrolyte) through the diaphragm into the catholyte compartment, e.g., an effective amount, thereby to reduce the permeability of the diaphragm to a value within the desired operating range chosen for the treated cell and raise the level of anolyte liquor in the anolyte compartment. In the case of a chlor-alkali cell, the flow rate of anolyte through the diaphragm is typically within the range of from 0.001 to 0.5 cubic centimeters per minute per square centimeter of effective diaphragm surface area. Dopant material can be introduced into the anolyte compartment while the cell is operating.

Ceramic microspheres (with or without other dopant materials) can be introduced batch wise into the anolyte compartment. Ceramic microspheres (with or without other dopant materials) may be introduced continuously into the anolyte compartment. Regardless of the manner by which ceramic microspheres are introduced into the anolyte compartment, e.g., batch wise (periodically) or continuously, the ceramic microspheres can be introduced dry, as wetted microspheres, or in the form of a slurry, e.g., an aqueous slurry. In the case where an aqueous slurry is used, the aqueous portion of the slurry can be, but is not limited to, water, anolyte feed, e.g., brine, or mixtures of such aqueous liquids. Generally, water or brine feed is used to prepare the aqueous slurry. Ceramic microsphere material can be introduced periodically, e.g., batchwise, into the anolyte compartment.

The amount of ceramic microsphere charged to the anolyte compartment during each occurrence of doping with ceramic microsphere can range from 0.1 to 30 grams of ceramic microsphere per square foot (0.01 to 2.7 grams per square meter [$m^2$]) of effective diaphragm surface area (the surface area through which electrolyte passes into the catholyte compartment). Also, the amount of ceramic microsphere introduced into the anolyte compartment can range from 0.1 to 10 grams of ceramic microsphere per square foot (0.01 to 0.9 grains/$m^2$) of effective diaphragm surface area, e.g., from 0.1 to 8.5 grams per square foot (0.01 to 0.77 grams $m^2$) of effective diaphragm surface area. Further, the amount of ceramic microsphere introduced into the anolyte compartment can range from 0.1 to 5, e.g., 0.3 to 3, grams of ceramic microsphere per square foot (0.01 to 0.45, e.g., 0.03 to 0.27 grams/$m^2$) of effective diaphragm surface area. The amount of ceramic microsphere introduced into the anolyte compartment can vary between any combination of the stated values, including the recited amounts. Care should be observed that the amount of ceramic microsphere (including the amount of any other dopant material) added to the anolyte is not excessive, thereby resulting in either plugging of the diaphragm or reducing the flow of electrolyte through the diaphragm to rates substantially below that of normal flow rates. Ceramic microsphere can represent all or a portion, e.g., from 5 to 100 percent, of dopant material used.

The ceramic microsphere material introduced as dopant into the anolyte compartment and/or as a constituent of the topcoat is at least partially resistant to the environment within the electrolytic cell, e.g., the anolyte compartment, for a reasonable period of time. Such time period can vary, and will depend, for example, on the particular ceramic microsphere used, the conditions that exist within the electrolytic cell, e.g., turbulence, power (load) variations, cell outages, and the corrosive conditions existing within the cell. In a non-limiting embodiment, the electrolytic cell will operate at substantially stable operating conditions for that particular cell after the addition of ceramic microsphere dopant for from approximately 1 to 12 weeks or longer. Similarly, once an electrolytic cell containing a diaphragm comprising a base mat on which is at least one topcoat comprising ceramic microspheres reaches stable operating conditions, the ceramic microspheres are expected to be resistant to the environment within the cell for approximately 1 to 12 weeks or longer.

Corrosive conditions within the anolyte of an electrolytic cell may result from, for example, oxidizing conditions, pH and temperature. For example, in a chlor-alkali electrolytic cell, the pH of the anolyte is generally acidic. Moreover, corrosive conditions within the anolyte compartment of a chlor-alkali cell can be caused by the presence of chlorine, hydrochloric acid, hypochlorous acid, chlorate ions and oxygen therein. Further, it is possible for the added ceramic microspheres to be exposed to corrosive conditions within the catholyte of the electrolytic cell, e.g., alkaline materials such as alkali metal hydroxide, which is present on or in the diaphragm or that back migrates from the catholyte department. Such exposure may also cause chemical degradation of the ceramic microspheres. In addition, the ceramic microspheres may be eroded by mechanical forces operating within the anolyte compartment or be dissolved chemically by chemicals present within the anolyte compartment. In the event of chemical degradation or erosion of the ceramic microspheres, increased permeability of the diaphragm is likely to reoccur. Generally, the increased permeability will reoccur gradually. When increased permeability reoccurs, the addition of further quantities of dopant material, e.g., ceramic microspheres, to the anolyte compartment may be required.

As noted, at least one dopant material(s) other than ceramic microspheres can be introduced into the anolyte compartment in conjunction with the ceramic microsphere dopant. In a non-limiting embodiment, at least one other dopant material, e.g., clay mineral, is added to the anolyte compartment at substantially the same time as the ceramic microspheres, e.g., in a common aqueous slurry. In alternate non-limiting embodiments, at least one dopant material (other than ceramic microspheres) is added before or subsequent to, e.g., sequentially, to the addition of the ceramic microsphere dopant. As used herein and in the claims, the term "in conjunction with" means and includes the addition of at least one other dopant material to the anolyte compartment at substantially the same time, e.g., simultaneously, such as a constituent of the same slurry, and/or in sequence, e.g., before and/or after the addition of ceramic microspheres.

Clay mineral added to the anolyte compartment of the electrolytic diaphragm cell as dopant material can be chosen from the same clay mineral materials used to form the topcoat adhered to the diaphragm base mat, e.g., attapulgite clay mineral. In addition to clay mineral, alkaline earth metal oxides and hydrous oxides may be used as dopant material. In a non-limiting embodiment, alkaline earth metal hydroxide, e.g., magnesium hydroxide, is used as a dopant material.

Fibers comprising halogen-containing polymer, e.g., fluorocarbon polymer, can be added as dopant material to the anolyte compartment of the electrolytic cell in conjunction with the ceramic microspheres. Non-limiting examples of other halogen-containing polymer fibers are described herein in connection with the description of the base mat for the diaphragm.

Also, dopant material comprising ceramic fibers can be added as dopant material in conjunction with ceramic microsphere dopant. Alkaline earth metal oxides and hydroxides, e.g., magnesium hydroxide, can be added as dopant material in conjunction with ceramic microspheres. Further, non-ceramic valve metal oxide, e.g., titanium and/or zirconium oxide, is added as dopant material in conjunction with ceramic microspheres.

The order in which the ceramic microspheres and at least one other dopant material, e.g., halogen-containing polymer fibers, ceramic fibers, valve metal oxide, alkaline earth metal oxides/hydroxides and/or clay mineral, are added to the anolyte compartment can vary. Generally, for reasons of convenience, a mixture of one or more of the aforementioned materials, e.g., an aqueous slurry of all of the dopant materials, is prepared and the mixture added to the anolyte compartment.

Chemical analysis of catholyte liquor subsequent to the initial introduction of dopant material, e.g., ceramic microsphere and other dopant materials to the anolyte compartment and after equilibrium within the cell is substantially attained will determine if sufficient dopant material has been introduced to return the cell to its desired operating conditions, or whether additional amounts of dopant material is required. Such chemical analyses are good indicators of whether cell operation is within the range of stable cell operating conditions. Periodic chemical analysis of the catholyte liquor after dopant material addition avoids inadvertently causing undesired cell operating conditions. The steps of catholyte liquor analysis and dopant material addition to the anolyte compartment can be repeated until the cell returns to a desired operating condition.

The present invention is more particularly described in the following examples, which are intended as illustrative only, since numerous modifications and variations therein will be apparent to those skilled in the art.

In the following examples, all reported percentages are weight percents, unless noted otherwise or unless indicated as otherwise from the context of their use. The reported current efficiencies of the described laboratory chlor-alkali electrolytic diaphragm cells are "caustic efficiencies", which are calculated by comparing the amount of sodium hydroxide collected over a given time period with the theoretical amount of sodium hydroxide that would be generated applying Faraday's Law. Unless otherwise noted, the aqueous sodium chloride brine used in the examples is an aqueous brine containing 25 percent by weight of sodium chloride, based on the total weight of the brine. The day following the day in which each electrolytic cell was started Lip is referred to as the first day or day 1 of cell operation.

The electrolytic cells used in the following examples were laboratory chlor-alkali cells constructed of TEFLON® polytetrafluoroethylene. Each cell had an active electrode area of 9 square inches (58 square centimeters [cm]). The catholyte and anolyte compartments of each electrolytic cell had a volume of 130 milliliters (ml). A ruthenium oxide coated titanium mesh electrode (Electrode Corporation "EC-200") was used as the anode, and a woven mild steel 6 mesh screen electrode was used as the cathode. The cathode and anode were separated by a distance of approximately 3/16 inch (0.48 cm). The uncoated side of a topcoated liquid permeable asbestos-free synthetic diaphragm was positioned in an abutting relationship with the cathode, and separated the catholyte and anolyte compartments of each cell.

The synthetic diaphragm base mat used in each of the cells comprised fibrous polytetrafluoroethylene (PTFE), PTFE microfibers (fibrils), NAFION® ion exchange material having sulfonic acid functional groups, fiberglass and SHORT STUFF polyethylene fibers. The synthetic diaphragm base mat was deposited onto a mild steel perforated plate by vacuum deposition of an aqueous slurry of the materials comprising the diaphragm. In examples 1-6, the synthetic diaphragm (base mat) had a base weight (dry) of approximately 0.46 pounds/square foot (2.2 kg/m$^2$).

The base mat (used in Examples 1-6) was separated from the mild steel perforated plate and was observed to be substantially uniform in appearance, having no visually observable indication of surface defects, such as cracking. The base mat was cut into 3$^{15}$/$_{16}$ inch by 3$^{15}$/$_{16}$ inch (10 cm×10 cm) squares in order to provide a 3 inch by 3 inch (7.6 cm×7.6 cm) active diaphragm area and a region for overlay of gasketing material. Each of the 3$^{15}$/$_{16}$ inch by 3$^{15}$/$_{16}$ inch (10 cm×10 cm) square synthetic diaphragm base mats used for Examples 2-6 was coated by drawing an aqueous slurry (by vacuum deposition) of inorganic particulate material comprising ATTAGEL® attapulgite clay, selected ceramic microspheres, zirconium dioxide, and magnesium hydroxide through the diaphragm base mat. The square synthetic diaphragm base mat used for Example 1 (a comparative example) was similarly coated except that the aqueous topcoat slurry did not contain ceramic microspheres.

For Examples 1-6, the base weight (dry) of the topcoats varied from approximately 0.038 to 0.05 pounds/square foot (0.18 to 0.24 kg/m$^2$), which was estimated from the measured increase in dry weight before and after applying the topcoat to the base mat. The gross weight of each of the coated diaphragms was approximately 0.5 pounds/square foot (2.4 kg/m$^2$). Separate topcoated diaphragm squares were used as the diaphragm in the laboratory chlor-alkali cells of Examples 1-6.

In Examples 7-8, the synthetic diaphragm (base mat) had a basis weight (dry) of approximately 0.45 pounds/square foot (2.2 kg/m$^2$). The aforedescribed synthetic diaphragm base mat was coated on the in mild steel perforated plate by drawing an aqueous topcoat slurry (by vacuum deposition) of inorganic particulate material comprising ATTAGEL® attapulgite clay, zirconium dioxide, and magnesium hydroxide through the diaphragm base mat. The base weight (dry) of the topcoat was approximately 0.05 pounds/square foot (0.24 kg/m$^2$), which was estimated from the measured increase in dry weight before and after applying the topcoat to the base mat. The gross weight of the coated diaphragm was approximately 0.5 pounds/square foot (2.4 kg/m$^2$). The topcoated diaphragm was separated from the mild steel perforated plate and was observed to be substantially uniform in appearance, having no visually observable indication of surface defects, such as cracking. The topcoated diaphragm base mat was cut into 3$^{15}$/$_{16}$ inch by 3$^{15}$/$_{16}$ inch (10 cm×10 cm) squares in order to provide a 3 inch by 3 inch (7.6 cm×7.6 cm) active diaphragm area and a region for overlay of gasketing material. Separate squares were used as the diaphragm in the laboratory chlor-alkali cells of examples 7-8. Example 7 is a comparative example.

The synthetic base mat of the diaphragm used in each of the cells for Examples 9-13 comprised fibrous polytetrafluoroethylene (PTFE), PTFE microfibers (fibrils), NAFION® ion exchange material having sulfonic acid functional groups, fiberglass and SHORT STUFF polyethylene fibers. The synthetic diaphragm was deposited onto a mild steel perforated plate by vacuum deposition of an aqueous slurry of the materials comprising the diaphragm. The foregoing synthetic diaphragm (base mat) had a basis weight density (dry) of approximately 0.45 pounds/square foot (2.2 kg/m$^2$). The synthetic diaphragm was coated by drawing a topcoat aqueous slurry (by vacuum deposition) of inorganic particulate material comprising ATTAGEL® attapulgite clay, zirconium dioxide, and magnesium hydroxide through the diaphragm base mat. The base weight density (dry) of the topcoat was approximately 0.05 pounds/square foot (0.24 kg/m$^2$), which was estimated from the measured increase in dry weight before and after applying the topcoat to the base mat. The topcoated diaphragm was separated from the mild steel perforated plate and was observed to be substantially uniform in appearance, having no visually observable indication of surface defects, such as cracking. The foregoing topcoated diaphragm pelt was cut into 3$^{15}$/$_{16}$ inch by 3$^{15}$/$_{16}$ inch (10 cm×10 cm) squares in order to provide a 3 inch by 3 inch (7.6 cm×7.6 cm) active diaphragm area and a region for overlay of gasketing material. The gross weight of the diaphragm pelt was approximately 0.50 pounds/square foot (2.4 kg/m$^2$).

The concentration and temperature of sodium chloride brine fed to the anolyte compartments of each of the electrolytic cells used in the Examples was approximately 305 grams per liter (gpl), and room temperature. The amperage applied to each electrolyzer element was approximately 144 amperes per square foot (1.55 KA/square meter). The voltage across each cell was allowed to float but, as measured, was approximately 3 volts.

After the diaphragm used in the electrolytic cell of a described example was installed, the anolyte compartment was filled with deionized water and deionized water fed to the anolyte compartment at the targeted sodium chloride brine feed rates, e.g., >2.5 milliliters/minute, for 10 to 18 hours to flush the diaphragm. The feed of deionized water was then stopped and water in the anolyte and catholyte compartments removed by aspiration. Sodium chloride brine feed was then introduced into the anolyte compartment until the catholyte compartment was full and overflowing. This portion of the cell start-up procedure took from 1 to 2 hours. The cell heater was then turned on and the cell temperature allowed to reach 195° F. (90.6° C.) before the cell was energized.

During steady state operation, analysis of the catholyte liquor was performed at approximately seven-day intervals. 1 Normal hydrochloric acid was added to the dopant medium used in the examples, as needed, to maintain the pH of the anolyte in a range of approximately 1-2. Reported cell caustic efficiencies in the examples are corrected to 50% brine depletion. Brine depletion (BD) is calculated by the expression: moles NaOH produced/(moles of NaOH produced)+(moles unreacted NaCl). Corrected cell efficiency is calculated by the expression: Corrected Cell Efficiency (%)=As is efficiency−[(50—As is brine depletion)]0.4. Hence, if an electrolytic cell is running at 95% As is efficiency and at 52% BD, the corrected cell efficiency is 95.8%, which is calculated according to the preceding formula as 95−(50−52)0.4=95−(−2×0.4)=95.8% (corrected efficiency).

EXAMPLE 1

A laboratory chlor-alkali electrolytic diaphragm cell was fitted with a $3^{15}/_{16}$ inch by $3^{15}/_{16}$ inch (10 cm×10 cm) square coated synthetic diaphragm base mat, as previously described. As noted, the topcoat did not contain ceramic microspheres. The base weight density (dry) of the topcoat was approximately 0.038 pounds per square foot (0.18 kg/m$^2$).

At start up, the cell was doped twice with a dopant medium of 100 ml of sodium chloride brine containing 0.1 grain of ATTAGEL 50 clay and 0.07 grains of magnesium hydroxide. On day 4 of cell operation, the cell was doped with a dopant medium of 100 ml of sodium chloride brine containing 0.1 gram of ATTAGEL 50 clay, 0.07 grams of magnesium hydroxide, and 1.25 ml of 1 Normal hydrochloric acid On day 7 of cell operation, the cell was doped with a dopant medium of 100 ml of sodium chloride brine containing 0.1 gram of ATTAGEL 50 clay, clay, 0.07 grams of magnesium hydroxide, and 0.37 ml of 1 Normal hydrochloric acid. The cell operated for 62 days after which the cell was taken out of service.

The average corrected caustic efficiency of the cell was calculated to be 96.0%. The average NaOH concentration produced by the cell was 111 grams per liter (gpl). The average sodium chlorate concentration in the catholyte was 0.12 gpl.

EXAMPLE 2

A laboratory chlor-alkali electrolytic cell of the type described in Example 1 was fitted with a $3^{15}/_{16}$ inch by $3^{15}/_{16}$ inch (10 cm×10 cm) square synthetic diaphragm base mat that was coated with a composition comprising approximately 59.8 weight percent zirconium dioxide, 32.1 weight percent ATTAGEL 50 attapulgite clay and 8 weight percent ZEEOSPHERE G-400 ceramic microspheres. The reported nominal particle size distribution (by 3M) of G-400 ZEEOSPHERE ceramic microspheres is from 0.3 to 24 microns. The base weight (dry) of the topcoat was approximately 0.05 pounds per square foot (0.24 kg/m$^2$).

At start up, the cell was doped with a dopant medium of 100 ml of sodium chloride brine, 0.1 gram ATTAGEL 50 clay, and 0.07 grams of magnesium hydroxide. On day 3 of cell operation, the cell was doped with a dopant medium of 100 ml of sodium chloride brine, 0.1 gram ATTAGEL 50 clay, 0.07 grams of magnesium hydroxide, and 2.95 ml of 1 Normal hydrochloric acid. During day 4 of cell operation, the cell was doped with a dopant medium of 100 ml of sodium chloride brine, 0.1 gram ATTAGEL 50 clay, 0.07 grams of magnesium hydroxide, and 0.30 ml of 1 Normal hydrochloric acid. During day 8 of cell operation, the cell was doped again with a dopant medium of 100 ml of sodium chloride brine, 0.1 gram ATTAGEL 50 clay, 0.07 grams of magnesium hydroxide, and 3.0 ml of 1 Normal hydrochloric acid. On day 18 of cell operation, the cell was doped with a dopant medium of 100 ml of sodium chloride brine, 0.1 grain ATTAGEL 50 clay, and 0.07 grams of magnesium hydroxide. On day 38 of cell operation, the cell was doped with a dopant medium of 100 ml of sodium chloride brine, 0.1 gram ATTAGEL 50 clay, and 0.07 grams of magnesium hydroxide. After 62 days of operation, the cell was taken out of service.

The average corrected caustic efficiency of the cell was calculated to be 97.0%. The average NaOH concentration produced by the cell was 111 grains per liter (gpl). The average sodium chlorate concentration in the catholyte was 0.05 gpl.

EXAMPLE 3

A laboratory chlor-alkali electrolytic cell of the type described in Example 2 were used in this example except that the diaphragm base mat was coated with a composition comprising approximately 59.85 weight percent zirconium dioxide, 20.01 weight percent ATTAGEL 50 attapulgite clay and 20.11 weight percent ZEEOSPHERE G-400 ceramic microspheres. The base weight (dry) of the topcoat was approximately 0.047 pounds per square foot (0.23 kg/m$^2$).

At start up, the cell was doped with a dopant medium of 100 ml of sodium chloride brine, 0.1 gram ATTAGEL 50 clay, and 0.07 grams of magnesium hydroxide. On day 3 of cell operation, the cell was doped with a dopant medium of 100 ml of sodium chloride brine, 0.1 gram ATTAGEL 50 clay, 0.07 grams of magnesium hydroxide, and 3.0 ml of 1 Normal hydrochloric acid. During day 4 of cell operation, the cell was doped with a dopant medium of 100 ml of sodium chloride brine, 0.1 gram ATTAGEL 50 clay, 0.07 grains of magnesium hydroxide, and 2.7 ml of 1 Normal hydrochloric acid. During day 5 of cell operation, the cell was doped again with a dopant medium of 100 ml of sodium chloride brine, 0.1 gram ATTAGEL 50 clay, 0.07 grains of magnesium hydroxide, and 0.13 ml of 1 Normal hydrochloric acid. On day 18 of cell operation, the cell was doped with a dopant medium of 100 ml of sodium chloride brine, 0.1 gram ATTAGEL 50 clay, and 0.07 grains of magnesium hydroxide. After 62 days of operation, the cell was taken out of service.

The average corrected caustic efficiency of the cell was calculated to be 97.0%. The average NaOH concentration produced by the cell was 113 grains per liter (gpl). The average sodium chlorate concentration in the catholyte was 0.09 gpl.

EXAMPLE 4

A laboratory chlor-alkali electrolytic cell of the type described in Example 2 was used in this example except that the topcoat comprised 60.01% zirconium dioxide, 32.02% ATTAGEL 50 clay, and 7.97% of ZEEOSPHERE G-600 ceramic microspheres. The reported nominal size distribution (by 3M) of G-600 ZEEOSPHERE ceramic microspheres is from 0.3 to 40 microns. The base weight (dry) of the topcoat was approximately 0.047 pounds per square foot (0.23 kg/m$^2$).

At start up, the cell was doped with a dopant medium of 100 ml of sodium chloride brine, 0.1 gram ATTAGEL 50 clay, and 0.07 grams of magnesium hydroxide to control the level of the anolyte in the anolyte compartment. On day 3 of cell operation, the cell was doped with a dopant medium of 100 ml of sodium chloride brine, 0.1 grain ATTAGEL 50 clay, 0.07 grams of magnesium hydroxide, and 2.3 ml of 1 Normal hydrochloric acid. During day 4 of cell operation, the cell was doped with a dopant medium of 100 ml of sodium chloride brine, 0.1 gram ATTAGEL 50 clay, 0.07 grains of magnesium hydroxide, and 1.5 ml of 1 Normal hydrochloric acid. During day 8 of cell operation, the cell was doped with a dopant medium of 100 ml of sodium chloride brine, 0.1 gram ATTAGEL 50 clay, 0.07 grams of magnesium hydroxide, and 3.6 ml of 1 Normal hydrochloric acid. During day 15 of cell operation, the cell was doped with a dopant medium of 100 ml of sodium chloride brine, 0.1 gram ATTAGEL 50 clay, 0.07 grams of magnesium hydroxide, and 2.9 ml of 1 Normal (1N) hydrochloric acid (HCl). On day 38 of cell operation, the cell was doped with a dopant medium of which 3.8 ml of 1 Normal (1N) hydrochloric acid (HCl) had been added. After 62 days of operation, the cell was taken out of service.

The average corrected caustic efficiency of the cell was calculated to be 97.3%. The average NaOH concentration produced by the cell was 113 grams per liter (gpl). The average sodium chlorate concentration in the catholyte was 0.08 gpl.

EXAMPLE 5

A laboratory chlor-alkali electrolytic cell of the type described in Example 2 was used in this example except that the topcoat comprised 59.89% zirconium dioxide, 32.02 ATTAGEL 50 clay, and 8.09% ZEEOSPHERE G-800 ceramic microspheres. The reported nominal size distribution (by 3M) of G-800 ZEEOSPHERE ceramic microspheres is from 0.3 to 200 microns. The base weight (dry) of the topcoat was approximately 0.035 pounds per square foot (0.17 kg/m$^2$).

At start up, the cell was doped with a dopant medium of 100 ml of sodium chloride brine, 0.1 gram ATTAGEL 50 clay, and 0.07 grams of magnesium hydroxide to control the level of the anolyte in the anolyte compartment. On day 3 of cell operation, the cell was doped with a dopant medium of 100 ml of sodium chloride brine, 0.1 gram ATTAGEL 50 clay, 0.07 grams of magnesium hydroxide, and 3.6 ml of 1 Normal hydrochloric acid. During day 4 of cell operation, the cell was doped with a dopant medium of 100 ml of sodium chloride brine, 0.1 gram ATTAGEL 50 clay, 0.07 grains of magnesium hydroxide, and 4.4 ml of 1 Normal hydrochloric acid. During day 5 of cell operation, the cell was doped with a dopant medium of 100 ml of sodium chloride brine, 0.1 gram ATTAGEL 50 clay, 0.07 grams of magnesium hydroxide, and 0.57 ml of 1 Normal hydrochloric acid. During day 10 of cell operation, the cell was doped with a dopant medium of 100 ml of sodium chloride brine, 0.1 gram ATTAGEL 50 clay, and 0.07 grams of magnesium hydroxide. On day 41 of cell operation, the cell was doped with a dopant medium of 100 ml of sodium chloride brine, 0.1 gram ATTAGEL 50 clay, 0.07 grams of magnesium hydroxide, and 2.6 ml of 1 Normal hydrochloric acid. After 62 days of operation, the cell was taken out of service.

The average corrected caustic efficiency of the cell was calculated to be 97.0%. The average NaOH concentration produced by the cell was 118 grams per liter (gpl). The average sodium chlorate concentration in the catholyte was 0.15 gpl.

EXAMPLE 6

A laboratory chlor-alkali electrolytic cell of the type described in Example 2 was used in this example except that the topcoat solids comprised 59.94% zirconium dioxide, 20.05% ATTAGEL 50 clay, and 20.01% ZEEOSPHERE G-800 ceramic microspheres. The reported nominal size distribution (by 3M) of G-800 ZEEOSPHERE ceramic microspheres is from 0.3 to 200 microns. The base weight density (dry) of the topcoat was approximately 0.041 pounds per square foot (0.2 kg/m$^2$).

At start up, the cell was doped with a dopant medium of 100 ml of sodium chloride brine, 0.1 gram ATTAGEL 50 clay, and 0.07 grams of magnesium hydroxide to control the level of the anolyte in the anolyte compartment. On day 2 of cell operation, the cell was doped with a dopant medium of 100 ml of sodium chloride brine, 0.1 gram ATTAGEL 50 clay, 0.07 grams of magnesium hydroxide, and 2.0 ml of 1 Normal hydrochloric acid. On day 3 of cell operation, the cell was doped once with a dopant medium of 100 ml of sodium chloride brine, 0.1 gram ATTAGEL 50 clay, 0.07 grams of magnesium hydroxide, and 3.4 ml of 1 Normal hydrochloric acid, and once with a dopant medium of 100 ml of sodium chloride brine, 0.1 gram ATTAGEL 50 clay, 0.07 grains of magnesium hydroxide, and 0.76 ml of 1 Normal hydrochloric acid. During day 5 of cell operation, the cell was doped with a dopant medium of 100 ml of sodium chloride brine, 0.1 gram ATTAGEL 50 clay, 0.07 grains of magnesium hydroxide, and 3.3 ml of 1 Normal hydrochloric acid. During day 7 of cell operation, the cell was doped with a dopant medium of 100 ml of sodium chloride brine, 0.1 gram ATTAGEL 50 clay, 0.07 grams of magnesium hydroxide, and 2.7 ml of 1 Normal hydrochloric acid. During day 14 of cell operation, the cell was doped with a dopant medium of 100 ml of sodium chloride brine, 0.1 gram ATTAGEL 50 clay, 0.07 grams of magnesium hydroxide, and 2.2 ml of 1 Normal hydrochloric acid. On day 37 of cell operation, the cell was doped with a dopant medium of 100 ml of sodium chloride brine, 0.1 gram ATTAGEL 50 clay, 0.07 grams of magnesium hydroxide, and 1.6 ml of 1 Normal hydrochloric acid. During day 58 of cell operation, the cell was doped with a dopant medium of 100 ml of sodium chloride brine, 0.1 grain ATTAGEL 50 clay, and 0.07 grams of magnesium hydroxide. After 61 days of operation, the cell was taken out of service.

The average connected caustic efficiency of the cell was calculated to be 96.6%. The average NaOH concentration produced by the cell was 112 grams per liter (gpl). The average sodium chlorate concentration in the catholyte was 0.08 gpl.

EXAMPLE 7

A laboratory chlor-alkali electrolytic cell of the type described in Example 1 was used in this example. A dopant medium comprising 0.1 gram ATTAGEL 50 attapulgite clay, 0.07 gram magnesium hydroxide and 100 milliliters (ml) of sodium chloride brine was used to dope the laboratory chlor-alkali electrolytic diaphragm cell. At start up, the cell was doped with the dopant medium to control the level of the anolyte in the anolyte compartment. During day 1 of cell operation, the cell was doped again with the dopant medium to which 3.3 ml of 1 Normal (1N) hydrochloric acid (HCl) had been added. On day 4 of cell operation, the cell was doped with the dopant medium to which 1.8 ml of 1 N HCl had been added. On day 6 of cell operation, the cell was doped with the dopant medium to which 1.25 ml of 1 N HCl had been added. On day 11 of cell operation, the cell was doped with the dopant medium to which 1.3 ml of 1 N HCl had been added, and on day 17 of cell operation the cell was doped with the dopant medium to which 1.3 ml of 1 N HCl had been added. After 97 days of operation, the cell was taken out of service.

The average corrected caustic efficiency of the cell was calculated to be 96.7%. The average NaOH concentration produced by the cell was 114 grams per liter (gpl). The average sodium chlorate concentration in the catholyte was 0.10 gpl.

EXAMPLE 8

A laboratory chlor-alkali electrolytic cell of the type described in Example 1 which was equipped with a diaphragm similar to that described in Example 7 was used in this example. A dopant medium comprising 0.1 grain ZEEOSPHERE G-800 ceramic microspheres, 0.07 gram magnesium hydroxide and 100 milliliters (ml) of sodium chloride brine was used to dope the electrolytic cell. The reported nominal size distribution (by 3M) of G-800 ZEEOSPHERE ceramic microspheres is from 0.3 to 200 microns.

At start up, the cell was doped with the dopant medium to control the level of the anolyte in the anolyte compartment. During day 1 of cell operation, the cell was doped again with the dopant medium to which 3.8 ml of 1 Normal (1N) hydrochloric acid (HCl) had been added. On day 2 of cell operation, the cell was doped with the dopant medium to which 3.6 ml of 1 N HCl had been added. On days 3, 4 and 6 of cell operation, the cell was doped with the dopant medium to control the level of the anolyte. On day 7 of cell operation, the cell was doped with the dopant medium to which 1.2 ml of 1N HCl had been added, and on day 11 of cell operation, the cell was doped with the dopant medium to which 1.5 ml of 1N HCl had been added. On day 17 of cell operation, the cell was doped with the dopant medium. On day 55 of cell operation, the cell was doped with the dopant medium to which 2.4 ml 1N HCl had been added After 97 days of operation, the cell was taken out of service.

The average corrected caustic efficiency of the cell was calculated to be 96.7%. The average NaOH concentration produced by the cell was determined to be 114 grams per liter (gpl). The average sodium chlorate concentration in the catholyte was 0.04 gpl.

EXAMPLE 9

A dopant medium comprising 0.1 gram ZEEOSPHERE G-200, 0.07 gram magnesium hydroxide and 100 milliliters (ml) of sodium chloride brine was used to dope a laboratory chlor-alkali electrolytic diaphragm cell. The reported nominal size distribution (by 3M) of G-200 ZEEOSPHERE ceramic microspheres is from 0.3 to 12 microns. At start up, the cell was doped twice with the dopant medium to control the level of the anolyte in the anolyte compartment. During day 3 of cell operation, the cell was doped again with the dopant medium to which 3.2 ml of 1 Normal (1N) hydrochloric acid (HCl) had been added. On day 11 of cell operation, the cell was doped with the dopant medium to which 2.6 ml of 1 N HCl had been added. On day 14 of cell operation, the cell was doped with the dopant medium to which 3.0 ml of 1 N HCl had been added. On day 17 of cell operation, the cell was doped with the dopant medium to which 3.1 ml of 1 N HCl had been added, and on day 20 of cell operation the cell was doped with the dopant medium to which 3.45 ml of 1 N HCl had been added. On day 38 of cell operation, the cell was doped with the dopant medium to which 4.0 ml 1N HCl had been added. On day 64 of cell operation, the cell was doped with the dopant medium to which 2.6 ml of 1N HCl had been added. After 97 days of operation, the cell was taken out of service.

The average corrected caustic efficiency of the cell was calculated to be 96.9%. The average NaOH concentration produced by the cell was 114 grams per liter (gpl). The average sodium chlorate concentration in the catholyte was 0.12 gpl.

EXAMPLE 10

The dopant medium described in Example 9 was used to dope another laboratory chlor-alkali electrolytic diaphragm cell except that the grade of ZEEOSPHERE ceramic spheres used was G-400. The reported nominal size distribution (by 3M) of G-400 ZEEOSPHERE ceramic microspheres is from 0.3 to 24 microns. At start up, the cell was doped twice with the dopant medium to control the level of the anolyte in the anolyte compartment. During day 2 of cell operation, the cell was doped again with the dopant medium to which 3.8 ml of 1 Normal (1N) hydrochloric acid (HCl) had been added. On clay 3 of cell operation, the cell was doped with the dopant medium to which 1.4 ml of 1 N HCl had been added. On day 4 of cell operation, the cell was doped with the dopant medium to which 3.0 ml of 1 N HCl had been added. On day 6 of cell operation, the cell was doped with the dopant medium to which 2.2 ml of 1 N HCl had been added, and on day 11 of cell operation the cell was doped with the dopant medium to which 3.1 ml of 1 N HCl had been added. On day 17 of cell operation, the cell was doped with the dopant medium to which 1.7 ml 1N HCl had been added. On day 38 of cell operation, the cell was doped with the dopant medium to which 3.5 ml of 1N HCl had been added. On day 64 of cell operation, the cell was doped with the dopant medium to which 2.7 ml 1N HCl had been added After 97 days of operation, the cell was taken out of service.

The average corrected caustic efficiency of the cell was calculated to be 96.9%. The average NaOH concentration produced by the cell was 113 grams per liter (gpl). The average sodium chlorate concentration in the catholyte was 0.08 gpl.

EXAMPLE 11

The dopant medium described in Example 9 was used to dope another laboratory chlor-alkali electrolytic diaphragm cell except that the grade of ZEEOSPHERE ceramic spheres used was G-600. The reported nominal size distribution (by 3M) of G-600 ZEEOSPHERE ceramic microspheres is from 0.3 to 40 microns. At start up, the cell was doped with the dopant medium to control the level of the anolyte in the anolyte compartment. During day 1 of cell operation, the cell was doped again with the dopant medium to which 3.8 ml of 1 Normal (1N) hydrochloric acid (HCl) had been added. On day 3 of cell operation, the cell was doped with the dopant medium to which 3.6 ml of 1 N HCl had been added. On day 6 of cell operation, the cell was doped with the dopant medium to which 3.5 ml of 1 N HCl had been added. On day 7 of cell operation, the cell was doped with the dopant medium to which 3.3 ml of 1 N HCl had been added, and on day 11 of cell operation the cell was doped with the dopant medium to which 3.5 ml of 1 N HCl had been added. On day 21 of cell operation, the cell was doped with the dopant medium to which 3.05 ml 1N HCl had been added. On day 38 of cell operation, the cell was doped with the dopant medium to which 2.8 ml of 1N HCl had been added. On day 81 of cell operation, the cell was doped with the dopant medium to which 2.9 ml 1N HCl had been added After 97 days of operation, the cell was taken out of service.

The average corrected caustic efficiency of the cell was calculated to be 97.1%. The average NaOH concentration produced by the cell was 113 grains per liter (gpl). The average sodium chlorate concentration in the catholyte was 0.10 gpl.

EXAMPLE 12

The dopant medium described in Example 9 was used to dope another laboratory chlor-alkali electrolytic diaphragm cell except that the grade of ZEEOSPHERE ceramic spheres used was X-34. The reported nominal size distribution (by 3M) of X-34 ZEEOSPHERE ceramic microspheres is from 0.3 to 300 microns. At start up, the cell was doped with the dopant medium to control the level of the anolyte in the anolyte compartment. During day 1 of cell operation, the cell was doped again with the dopant medium to which 4.6 ml of 1 Normal (1N) hydrochloric acid (HCl) had been added. On day 2 of cell operation, the cell was doped with the dopant medium to which 3.4 ml of 1 N HCl had been added. On day 3 of cell operation, the cell was doped with the dopant medium to which 1.4 ml of 1 N HCl had been added. On day 4 of cell operation, the cell was doped with the dopant medium to which 1.5 ml of 1 N HCl had been added, and on day 6 of cell operation the cell was doped with the dopant medium. On day 7 of cell operation, the cell was doped with the dopant medium and on day 11 of cell operation, the cell was doped with the dopant medium to which 1.9 ml of 1N HCl had been added. On day 26 of cell operation, the cell was doped with the dopant medium to which 1.3 ml 1N HCl had been added. On day 64 of cell operation, the cell was doped with the dopant medium to which 1.3 ml 1N HCl had been added After 97 days of operation, the cell was taken out of service.

The average corrected caustic efficiency of the cell was calculated to be 97.0%. The average NaOH concentration produced by the cell was 113 grams per liter (gpl). The average sodium chlorate concentration in the catholyte was 0.09 gpl.

EXAMPLE 13

The dopant medium described in Example 9 was used to dope another laboratory chlor-alkali electrolytic diaphragm cell except that the grade of ZEEOSPHERE ceramic spheres used was G-800. The reported nominal size distribution (by 3M) of G-800 ZEEOSPHERE ceramic microspheres is from 0.3 to 200 microns. At start up, the cell was doped with the dopant medium to control the level of the anolyte in the anolyte compartment. During day 1 of cell operation, the cell was doped again with the dopant medium to which 3.8 ml of 1 Normal (1N) hydrochloric acid (HCl) had been added. On day 2 of cell operation, the cell was doped with the dopant medium to which 3.6 ml of 1 N HCl had been added. On days 3, 4 and 6 of cell operation, the cell was doped with the dopant medium to control the level of the anolyte. On day 7 of cell operation, the cell was doped with the dopant medium to which 1.2 ml of 1N HCl had been added, and on day 11 of cell operation, the cell was doped with the dopant medium to which 1.5 ml of 1N HCl had been added. On day 17 of cell operation, the cell was doped with the dopant medium. On day 55 of cell operation, the cell was doped with the dopant medium to which 2.4 ml 1N HCl had been added After 97 days of operation, the cell was taken out of service.

The average corrected caustic efficiency of the cell was calculated to be 96.7%. The average NaOH concentration produced by the cell was 114 grams per liter (gpl). The average sodium chlorate concentration in the catholyte was 0.04 gpl.

The present invention has been described with reference to specific details of particular embodiments thereof. It is not intended that such details be regarded as limitations upon the scope of the invention, except insofar as they are included in the accompanying claims.

What is claimed is:

1. A method for reducing the permeability of a microporous liquid-permeable diaphragm of an electrolytic diaphragm cell comprising an anolyte compartment, a catholyte compartment and a liquid-permeable diaphragm, said diaphragm separating the catholyte compartment from the anolyte compartment and comprising a base of fibrous material substantially resistant to the environment within the electrolytic cell, which method comprises adding to the anolyte compartment particles of spheroidal ceramic microspheres that are at least partially resistant to the environment within the electrolytic cell, said microsphere particles (a) being used in an amount and (b) having a nominal size distribution that are sufficient to reduce the permeability of the liquid permeable diaphragm.

2. The method of claim 1 wherein the spheroidal ceramic microspheres are particles comprising at least one metal oxide chosen from the oxides of the metals zirconium, titanium, hafnium, silicon, aluminum, boron, vanadium, niobium, tantalum, molybdenum, chromium, tungsten, iron, cobalt, nickel, copper, zinc, cadmium, cerium, lanthanum, yttrium, beryllium, calcium, magnesium, tin, lead, gallium, germanium or mixtures of such metal oxides.

3. The method of claim 1 wherein the spheroidal ceramic microspheres are particles comprising at least one metal oxide chosen from the oxides of the metals silicon, aluminum, titanium, zirconium, boron, chromium, iron, calcium, magnesium, tin, zinc or mixtures of such metal oxides.

4. The method of claim 1 wherein the amount of spheroidal ceramic microspheres added to the anolyte compartment ranges from 0.1 to 10 grams per square foot of effective diaphragm surface area.

5. The method of claim 1 wherein the spheroidal ceramic microspheres have a nominal size distribution in the range of from 0.3 to 300 microns.

6. The method of claim 1 wherein the spheroidal ceramic microspheres have a nominal size distribution in the range of from 0.3 to 200 microns.

7. The method of claim 1 wherein the spheroidal ceramic microspheres have a nominal particle size within the range of from 1 to 40 microns.

8. The method of claim 1 wherein the spheroidal ceramic microspheres have a nominal particle size within the range of from 4 to 20 microns.

9. A method for reducing the permeability of a microporous liquid-permeable diaphragm of a chlor-alkali electrolytic diaphragm cell comprising an anolyte compartment, a catholyte compartment and a liquid-permeable diaphragm, said diaphragm separating the catholyte compartment from the anolyte compartment and comprising a base of fibrous material substantially resistant to the environment within the electrolytic cell, which method comprises adding to the anolyte compartment particles of spheroidal ceramic microspheres that are at least partially resistant to the environment within the electrolytic cell, said microsphere particles comprising at least one metal oxide chosen from the oxides of the metals silicon, aluminum, titanium, zirconium, boron, chromium, iron, calcium, magnesium, tin, zinc or mixtures of such metal oxides and (a) being used in an amount and (b) having a nominal size distribution which are sufficient to reduce the permeability of the liquid permeable diaphragm.

10. The method of claim 9 wherein the microporous liquid-permeable diaphragm is a synthetic diaphragm.

11. The method of claim 10 wherein the amount of spheroidal ceramic microspheres added to the anolyte compartment ranges from 0.3 to 8.5 grams per square foot of effective diaphragm surface area.

12. The method of claim 11 wherein the spheroidal ceramic microspheres are added to the anolyte compartment while the electrolytic cell is operating.

13. The method of claim 12 wherein the spheroidal ceramic microspheres have a nominal size distribution in the range of from 0.3 to 300 microns and a nominal particle size within the range of from 1 to 40 microns.

14. The method of claim 12 wherein the spheroidal ceramic microspheres have a nominal size distribution in the range of from 0.3 to 200 microns and a nominal particle size within the range of from 4 to 20 microns.

15. A method for reducing the permeability of a microporous liquid-permeable diaphragm of a chlor-alkali electrolytic diaphragm cell comprising an anolyte compartment, a catholyte compartment and a synthetic liquid-permeable diaphragm, said diaphragm separating the catholyte compartment from the anolyte compartment and comprising a base of fibrous material substantially resistant to the environment within the electrolytic cell, which method comprises adding to the anolyte compartment while the electrolytic cell is operating from 0.3 to 8.5 grams per square foot of effective diaphragm surface area of spheroidal ceramic microsphere particles that are at least partially resistant to the environment within the electrolytic cell, said ceramic microsphere particles comprising at least one metal oxide chosen from the oxides of the metals silicon, aluminum, titanium, zirconium, boron, chromium, iron, calcium, magnesium, tin, zinc or mixtures of such metal oxides, said ceramic microsphere particles having a nominal size distribution within the range of 0.3 to 300 microns, the amount and size distribution of said ceramic microsphere particles being sufficient to reduce the permeability of the liquid permeable diaphragm.

16. The method of claim 15 wherein at least one other material chosen from clay minerals, ceramic fibers, valve metal oxide, alkaline earth metal oxides/hydroxides, and fibers comprising halogen-containing polymers are added to the anolyte compartment in conjunction with the spheroidal ceramic microspheres.

17. The method of claim 16 wherein a material chosen from clay minerals, alkaline earth metal oxides/hydroxides, fibers comprising halogen-containing polymers, and mixtures of such materials are added to the anolyte compartment in conjunction with the spheroidal ceramic microspheres, and the ceramic microspheres represent from 5 to 100 percent of the material added to the anolyte compartment to reduce the permeability of the diaphragm.

18. The method of claim 17 wherein the spheroidal ceramic microspheres have a nominal size distribution in the range of from 0.3 to 200 microns and a nominal particle size within the range of from 4 to 20 microns.

19. A method of associating spheroidal ceramic microspheres with a microporous liquid-permeable diaphragm structure of an electrolytic diaphragm cell comprising an anolyte compartment, a catholyte compartment and a diaphragm structure separating the catholyte compartment from the anolyte compartment, said diaphragm structure comprising a foraminous metal cathode to which is adhered a base of fibrous material substantially resistant to the environment within the electrolytic cell and on which base is applied at least one coating of substantially water-insoluble inorganic particulate material, which method comprises adding to the anolyte compartment spheroidal ceramic microspheres that are at least partially resistant to the environment within the electrolytic diaphragm cell, thereby to associate said spheroidal ceramic microspheres with the diaphragm structure, said spheroidal ceramic microspheres having a nominal size distribution and being added in amounts that are sufficient to reduce the permeability of the liquid permeable diaphragm.

20. The method of claim 19 wherein the spheroidal ceramic microspheres are particles comprising at least one metal oxide chosen from the oxides of the metals zirconium, titanium, hafnium, silicon, aluminum, boron, vanadium, niobium, tantalum, molybdenum, chromium, tungsten, iron, cobalt, nickel, copper, zinc, cadmium, cerium, lanthanum, yttrium, beryllium, calcium, magnesium, tin, lead, gallium, and germanium.

21. The method of claim 19 wherein the spheroidal ceramic microspheres comprise at least one metal oxide chosen from the oxides of the metals silicon, aluminum, titanium, zirconium, boron, chromium, iron, calcium, magnesium, tin and zinc.

22. The method of claim 19 wherein the amount of spheroidal ceramic microspheres added to the anolyte compartment ranges from 0.1 to 10 grams per square foot of effective diaphragm surface area.

23. The method of claim 19 wherein the spheroidal ceramic microspheres have a nominal size distribution in the range of from 0.3 to 300 microns.

24. The method of claim 19 wherein the spheroidal ceramic microspheres have a nominal size distribution in the range of from 0.3 to 200 microns.

25. The method of claim 19 wherein the spheroidal ceramic microspheres have a nominal particle size within the range of from 1 to 40 microns.

26. The method of claim 19 wherein the spheroidal ceramic microspheres have a nominal particle size within the range of from 4 to 20 microns.

27. A method of associating spheroidal ceramic microspheres with a microporous liquid-permeable diaphragm structure of a chlor-alkali electrolytic diaphragm cell comprising an anolyte compartment, a catholyte compartment and a liquid-permeable diaphragm structure separating the catholyte compartment from the anolyte compartment, said diaphragm structure comprising a foraminous metal cathode to which is adhered a base of fibrous material substantially resistant to the environment within the electrolytic cell and on which base is applied at least one coating of substantially water-insoluble inorganic particulate material, which method comprises adding to the anolyte compartment spheroidal ceramic microspheres that are at Least partially resistant to the environment within the electrolytic cell, said spheroidal ceramic microspheres comprising at least one metal oxide chosen from the oxides of the metals silicon, aluminum, titanium, zirconium, boron, chromium, iron, calcium, magnesium, tin and zinc, said spheroidal ceramic microspheres having a nominal size distribution and being added in amounts that are sufficient to reduce the permeability of the liquid permeable diaphragm.

28. The method of claim 27 wherein the microporous liquid-permeable diaphragm is a synthetic diaphragm.

29. The method of claim 28 wherein the amount of spheroidal ceramic microspheres added to the anolyte compartment ranges from 0.3 to 8.5 grams per square foot of effective diaphragm surface area.

30. The method of claim 29 wherein the spheroidal ceramic microspheres are added to the anolyte compartment while the electrolytic cell is operating.

31. The method of claim 30 wherein the spheroidal ceramic microspheres have a nominal size distribution in the range of from 0.3 to 300 microns and a nominal particle size within the range of from 1 to 40 microns.

32. The method of claim 30 wherein the spheroidal ceramic microspheres have a nominal size distribution in the range of from 0.3 to 200 microns and a nominal particle size within the range of from 4 to 20 microns.

33. A method of associating spheroidal ceramic microspheres with a microporous liquid-permeable diaphragm structure of a chlor-alkali electrolytic diaphragm cell comprising an anolyte compartment, a catholyte compartment and a liquid-permeable diaphragm structure separating the catholyte compartment from the anolyte compartment, said diaphragm structure comprising a foraminous metal cathode to which is adhered a base of fibrous synthetic material substantially resistant to the environment within the electrolytic cell and on which base is applied at least one coating of substantially water-insoluble inorganic particulate material, which method comprises adding to the anolyte compartment while the electrolytic cell is operating from 0.3 to 8.5 grams per square foot of effective diaphragm surface area of spheroidal ceramic microspheres that are at least partially resistant to the environment within the electrolytic cell, said spheroidal ceramic microspheres comprising at least one metal oxide chosen from the oxides of the metals silicon, aluminum, titanium, zirconium, boron, chromium, iron, calcium, magnesium, tin, and zinc, said ceramic microspheres having a nominal size distribution within the range of 0.3 to 300 microns, the amount and size distribution of the spheroidal ceramic microspheres added to the anolyte compartment being sufficient to reduce the permeability of the liquid permeable diaphragm.

34. The method of claim 33 wherein at least one other material chosen from clay minerals, ceramic fibers, valve metal oxide, alkaline earth metal oxides/hydroxides, and fibers comprising halogen-containing polymers are added to the anolyte compartment in conjunction with the spheroidal ceramic microspheres.

35. The method of claim 34 wherein a material chosen from clay minerals, alkaline earth metal oxides/hydroxides, fibers comprising halogen-containing polymers, and mixtures of such materials are added to the anolyte compartment in conjunction with the spheroidal ceramic microspheres, and the spheroidal ceramic microspheres represent from 5 to 100 percent of the material added to the anolyte compartment to reduce the permeability of the diaphragm.

36. The method of claim 35 wherein the spheroidal ceramic microspheres have a nominal size distribution in the range of from 0.3 to 200 microns and a nominal particle size within the range of from 4 to 20 microns.

* * * * *